United States Patent [19]
Zenke

[11] Patent Number: 5,964,109
[45] Date of Patent: *Oct. 12, 1999

[54] THEFT PREVENTION DEVICE

[76] Inventor: Howard Zenke, 124 Columbia Heights, Brooklyn, N.Y. 11201-1698

[*] Notice: This patent is subject to a terminal disclaimer.

[21] Appl. No.: 09/081,949

[22] Filed: May 21, 1998

Related U.S. Application Data

[63] Continuation-in-part of application No. 08/863,043, May 23, 1997, Pat. No. 5,829,283.

[51] Int. Cl.[6] .................................................. B60R 25/02
[52] U.S. Cl. ................................. 70/209; 70/238; 70/261; 70/19
[58] Field of Search ..................... 70/209–212, 225–227, 70/237, 238

[56] References Cited

U.S. PATENT DOCUMENTS

| | | | |
|---|---|---|---|
| 1,347,463 | 7/1920 | Jameson | 70/211 |
| 1,429,334 | 9/1922 | Furber | 70/209 |
| 1,448,658 | 3/1923 | Furber | 70/209 |
| 4,103,524 | 8/1978 | Mitchell et al. | 70/209 |
| 4,304,110 | 12/1981 | Fain | 70/209 |
| 5,007,259 | 4/1991 | Mellard | 70/209 |
| 5,055,823 | 10/1991 | Fuller | 340/426 |
| 5,333,478 | 8/1994 | Chuang | 70/209 |
| 5,415,018 | 5/1995 | Ferrante | 70/209 |
| 5,460,021 | 10/1995 | Taylor | 70/209 |
| 5,491,990 | 2/1996 | Von-Lambert | 70/209 |
| 5,555,754 | 9/1996 | Ferrante | 70/209 |
| 5,582,045 | 12/1996 | Ahmed | 70/209 |
| 5,676,000 | 10/1997 | Chen | 70/209 |
| 5,715,711 | 2/1998 | Jennison | 70/237 |
| 5,718,133 | 2/1998 | Chen et al. | 70/209 |
| 5,829,283 | 11/1998 | Zenke | 70/209 |

*Primary Examiner*—Suzanne Dino Barrett
*Assistant Examiner*—Teri Pham
*Attorney, Agent, or Firm*—Bliss McGlynn, P.C.

[57] ABSTRACT

A theft prevention device for a vehicle including a passenger compartment in which a steering wheel is provided to control the movement of the vehicle is disclosed. The theft prevention device includes a first arm having a first end, a second end and a central section. The theft prevention device also includes a second arm having a first end, a second end and a central section, wherein the central section of the first arm is pivotally secured to the central section of the second arm. The device also includes a first arm extension coupled to the first arm and a second arm extension coupled to the second arm. The first arm extension and the second arm extension are shaped to engage when the first arm and the second arm are properly aligned. The theft prevention device is also provided with a lock selectively coupled between the first arm and the second arm to lock the first arm relative to the second arm and securely position the theft prevention device within a vehicle steering wheel by locking the first arm and the second arm in an X-shaped orientation between the spokes of a steering wheel to obstruct the passenger compartment in the vehicle and deter the theft of the vehicle.

8 Claims, 7 Drawing Sheets

FIG-13

THEFT PREVENTION DEVICE

This application is a CIP-in-part of application Ser. No. 08/863,043 filed May 23, 1997 now U.S. Pat. No. 5,829,283.

BACKGROUND OF THE INVENTION

1. Field of the Invention

The invention relates to a vehicle theft prevention device. More particularly, the invention relates to a vehicle theft prevention device including first and second arms adapted for positioning within the steering wheel of a vehicle to obstruct the passenger compartment and deter a would-be thief.

2. Description of the Prior Art

Car theft has become a major problem throughout the United States, and many products have been developed to prevent and deter would-be thieves from stealing automobiles and the goods stored therein.

The vast majority of products are releasably secured to the control functions of the automobile when the owner leaves the automobile, and are intended to prevent a thief from using the car in a conventional manner. For example, bars may be secured to the steering wheel in a manner preventing a thief from properly steering. Similarly, a rod may be positioned between the steering wheel and the brake pedal, or acceleration pedal, to prevent a thief from properly stopping, steering, or accelerating the vehicle. Devices are also known that may be secured to the gear shift to prevent a thief from shifting the automobile out of "Park".

While prior devices are generally effective in preventing a thief from operating the automobile once he or she has entered the vehicle, they often fail to provide the deterrent necessary to discourage the thief from damaging the automobile when he or she attempts to enter the automobile. For example, these devices do not limit the thieves' access to the seating area and a thief is, therefore, provided with a work space in which he or she may steal objects stored within the passenger compartment. As a result, a thief is provided with full access to sit in the seat of the passenger compartment where he or she may steal air bags, stereo equipment, or goods stored in the glove box, despite the fact that the automobile cannot be stolen. The term "passenger compartment" is used throughout the remainder of this disclosure and should be understood to refer to the space between the front instrument panel and dashboard, and the front seat of the vehicle. As such, the "passenger compartment" includes, but is not limited to, the seating area, the driver seat, leg space, and the steering column.

More sophisticated theft prevention devices are also known in the prior art. These devices are commonly based upon complex electronic control systems. Devices of this type generally prevent unauthorized use of the automobile by disabling the car during ignition or after the thief has driven the automobile for a short time. In addition, these devices may also send a warning signal so the automobile owner can locate the stolen vehicle. As with the theft prevention devices discussed above, these electronic devices fail to provide the deterrent necessary to prevent a thief from attempting to steal the automobile. They also leave the passenger compartment open, providing the thief with full access to the passenger compartment. Electronic theft prevention devices are also expensive and are often difficult to incorporate into previously existing automobiles. As with prior mechanical theft prevention devices, electronic theft prevention devices do not limit a would-be thief's access to the passenger compartment of the automobile. The thief is, therefore, provided with a work area in which he or she is provided full access to the passenger compartment of the vehicle.

As a review of the prior art reveals, a need continues to exist for a cost effective theft prevention device which prevents theft of the automobile, substantially limits access to the passenger compartment of the automobile, and provides a visible deterrent to theft. The present invention provides such a device.

SUMMARY OF THE INVENTION

It is, therefore, an object of the present invention to provide a theft prevention device for a vehicle including a passenger compartment in which a steering wheel is provided to control the movement of the vehicle. The theft prevention device includes a first arm having a first end, a second end and a central section. The theft prevention device also includes a second arm having a first end, a second end and a central section, wherein the central section of the first arm is pivotally secured to the central section of the second arm. The device also includes a first arm extension coupled to the first arm and a second arm extension coupled to the second arm. The first arm extension and the second arm extension are shaped to engage when the first arm and the second arm are properly aligned. The theft prevention device is also provided with a lock selectively coupled between the first arm and the second arm to lock the first arm relative to the second arm and securely position the theft prevention device within a vehicle steering wheel by locking the first arm and the second arm in an X-shaped orientation to obstruct the passenger compartment in the vehicle and deter the theft of the vehicle.

It is also an object of the present invention to provide a theft prevention device wherein the lock is a spring lock secured to the first arm.

It is another object of the present invention to provide a theft prevention device wherein the first end of the first arm is pointed and the first end of the second arm is pointed to further obstruct the seating area of the vehicle.

It is a further object of the present invention to provide a theft prevention device wherein the central section of the first arm includes a first flange and the central section of the second arm includes a second flange, and the lock is coupled to the first flange and the second flange to lock the first arm and the second arm in a desired orientation.

It is also an object of the present invention to provide a theft prevention device wherein the second arm includes a third flange which may be aligned with the first flange of the first arm, and the lock is coupled to the first flange and third flange to lock the first arm and the second arm in a desired orientation.

It is another object of the present invention to provide a theft prevention device wherein the lock is a spring lock secured to the first flange.

It is a further object of the present invention to provide a theft prevention device wherein the first arm extension and the second arm extension engage to form a ring which may be wrapped about a spoke of a steering wheel to secure the theft prevention device to a steering wheel.

It is also an object of the present invention to provide a theft prevention device wherein the first arm extension includes a stop member which engages a stop member of the second arm extension when the first arm and the second arm are properly aligned.

It is another object of the present invention to provide a theft prevention device wherein the first arm extension and the second arm extension include means for holding the first arm and the second arm in proper alignment.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1–4, two embodiments of the theft prevention device are disclosed. The theft prevention device is designed for use with any motor vehicle including a passenger compartment 12 having a steering wheel 14 and a driver's seating area 16 positioned in front of the steering wheel 14. While the theft prevention device is disclosed below with reference to a specific steering wheel structure, the theft prevention device may be employed with a wide variety of steering wheels without departing from the spirit of the present invention. In addition, the theft prevention device may be employed in environments other than motor vehicles without departing from the spirit of the present invention.

With reference to the first embodiment disclosed in FIGS. 1, 2 and 5–7, the theft prevention device 10 includes an obstruction member 18. The obstruction member 18 includes a first arm 20 having a first end 22, a second end 24 and a central section 26. The obstruction member 18 also includes a second arm 28 having a first end 30, a second end 32 and a central section 34. A pivot pin 36 is pivotally secured to the central section 26 of the first arm 20 and the central section 34 of the second arm 28. As such, the first arm 20 and the second arm 28 may be pivotally moved relative to each, creating an X-shaped theft prevention device 10.

The first arm 20 includes a first semi-circular flange 38 extending from its central section 26 and the second arm 28 includes a second semi-circular flange 40 extending from its central section 26. In fact, the first semi-circular flange 38 of the first arm 20 lies directly over the second semi-circular flange 40 of the second arm 28, and the first and second semi-circular flanges 38, 40 rotate about the same axis.

As stated above, the first arm 20 and the second arm 28 may be rotated relative to each other to assume a variety of orientations. The first arm 20 and the second arm 28 may then be selectively locked at a desired orientation. Specifically, a lock 42 is mounted on the first flange 38 of the first arm 20. The lock 42 is a conventional spring lock, which exposes a locking member when the locking housing 44 is pressed downwardly. Once the locking member is exposed, a key may be used to securely lock the locking member in its exposed position.

The lock 42 is radially positioned to align with a plurality of holes 46 created in the second flange 40 of the second arm 28. As such, the first arm 20 and the second arm 28 are selectively locked by rotating the arms until the lock 42 on the first flange 38 aligns at a desired location with a hole 46 in the second flange 40. At this point, the lock 42 is actuated such that a locking member moves within the hole 46 of the second flange 40 to lock the first arm 20 and the second arm 28 in the desired orientation. As will be appreciated with the subsequent discussion, the second flange 40 is provided with a series of holes 46, permitting the first arm 20 and the second arm 28 to be locked in a wide variety of orientations. For example, the second flange includes holes for locking the first arm 20 at approximately 0°, 45°, 66°, and 90°. When the first arm 20 and the second arm 28 are locked at 0°, the arms are aligned and ready for storage.

Since it is likely that the theft prevention device will only be used with one vehicle at a time, the first and second arms will generally be rotated to one orientation each time the theft prevention device is placed into use. As such, screws 48 may be placed within the unused holes to facilitate the quick rotation of the first arm 20 and the second arm 28 to their desired locations. The screws 48 are preferably placed within each of the unused holes such that they extend only as far as the first flange 38, and do not hinder the movement of the first arm 20 and the second arm 28 relative to each other.

Movement of the first arm 20 relative to the second arm 28 may also be controlled by the provision of a detent 50 on the first arm 20 and a series of detent holes 52 in the second arm 28. The detent 50 and detent holes 52 are arranged to snap into engagement at the various locations were the lock 42 of the first arm 20 and the holes 46 of second arm 28 align.

Figure 1:
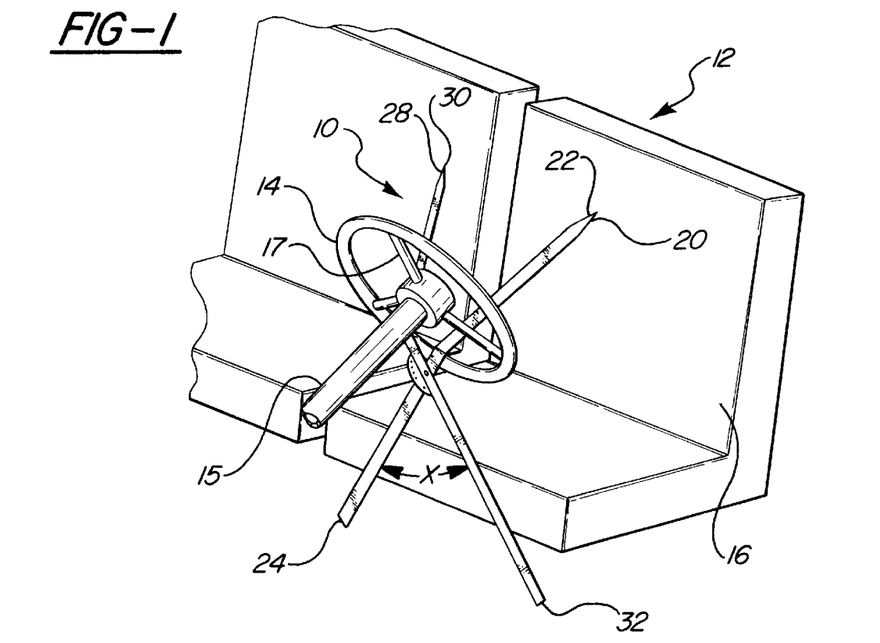
FIG. 1 a perspective view of a first embodiment of the present invention in use.
Figure 2:
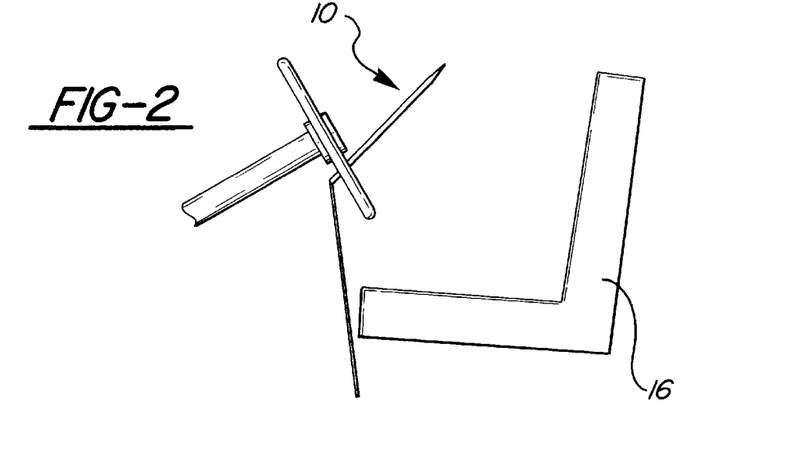
FIG. 2 is a side view of the first embodiment of the present invention.

The effectiveness of the present theft prevention device is enhanced by similarly bending the first arm 20 and the second arm 28 at positions between their central sections 26, 34 and their first ends 22, 30. The arms are preferably bent "y" to approximately a 135° angle, although other angles could be used without departing from the spirit of the present invention. The bend moves the first ends 22, 30 of the first arm 20 and the second arm 28 further into the seating area 16 of the passenger compartment 12 to further obstruct the seating area in the vehicle and deter the theft of the vehicle.

In addition to similarly bending the first and second arms, the first end 22 of the first arm 20 and the first end 30 of the second arm 30 are sharpened to points. The points are intended to further obstruct the seating area in the vehicle and deter the theft of the vehicle.

Movement of the first and second arms past a closed position is prevented by the provision of a clip 53 on the second arm 28. The clip 53 prevents the first arm 20 from rotating any further than an aligned orientation with the second arm 28.

A second embodiment of the present invention is disclosed in FIGS. 3, 4, 8 and 9. As with the first embodiment, the theft prevention device 110 includes a first arm 120 and a second arm 128 which are pivotal coupled by a pivot pin 136. However, the second embodiment replaces the lock mounted on the first flange of the first arm with a padlock 154 coupled to the steering wheel 14 by a chain 162.

Specifically, the first flange 138 is provided with a hole 156 where the lock was previously mounted. As such, the padlock 154 is placed within the hole 156 of the first flange 138 and a selected hole 146 of the second flange 140 to lock the first arm 120 and the second arm 128 in a desired orientation.

Figure 8:
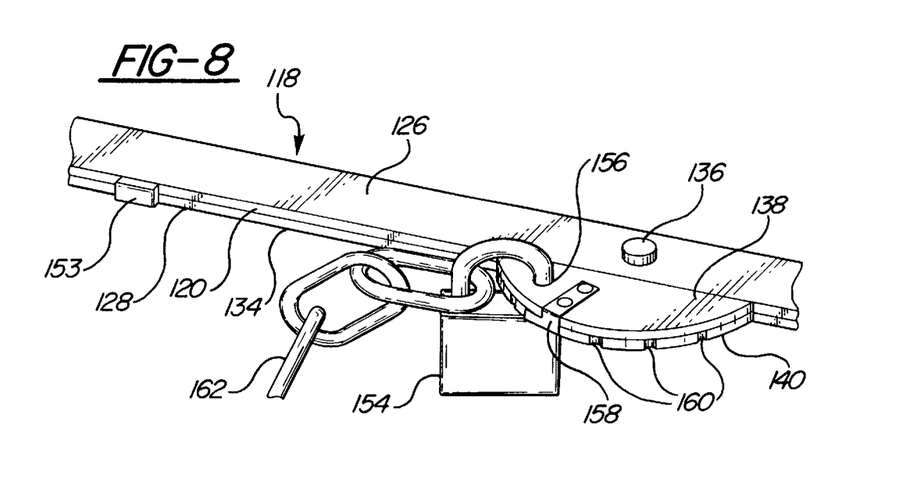
FIG. 8 is a detailed top perspective view of the second embodiment.
Figure 9:
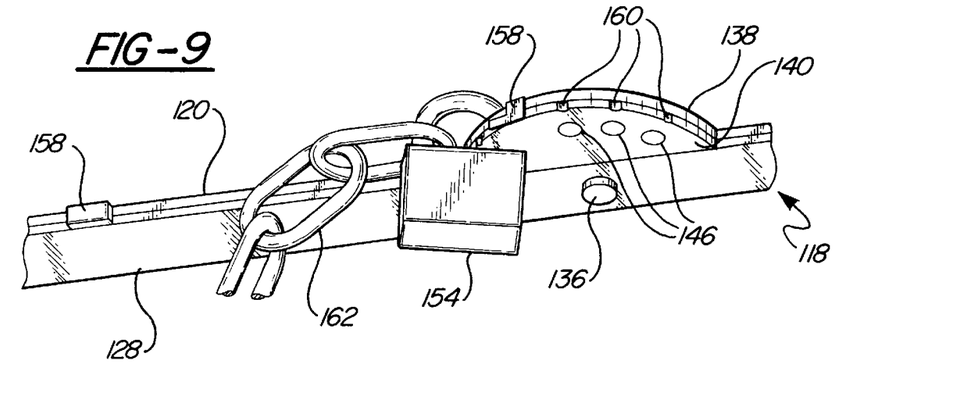
FIG. 9 is a detailed bottom perspective view of the second embodiment.
Figure 10:
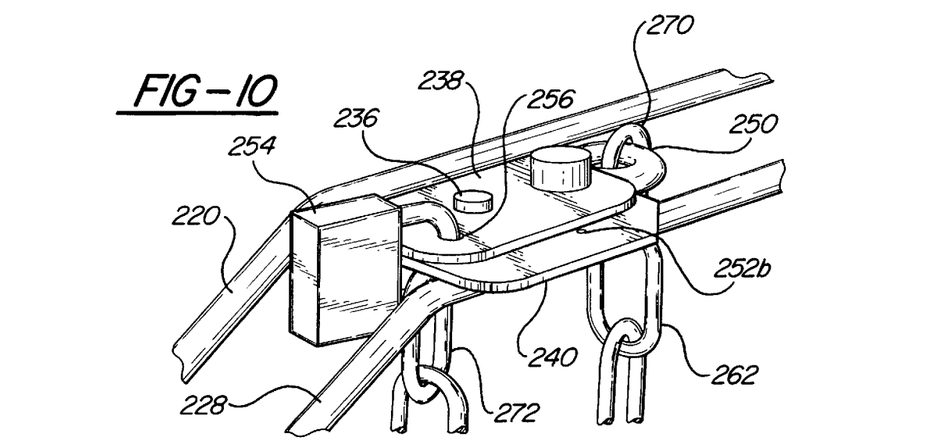
FIG. 10 is a detailed top perspective view of a third embodiment.

Orientation of the first flange 138 of the first arm 120 relative to the second flange 140 of the second arm 128 is enhanced by the provision of a locking clip 158 on the first flange 138 and a series of grooves 160 on the second flange 140. The locking clip 158 and grooves 160 are spaced such that the locking clip 158 engages the grooves 160 when the hole 156 in the first flange 138 aligns with specific holes 146 in the second flange 140. In this way, an individual using the present theft prevention device 110 may quickly align the desired holes, without constantly working to hold the first arm 120 and the second arm 128 relative to each other while he or she secures the padlock 154 within the holes of the first flange 138 and the second flange 140.

Figure 3:
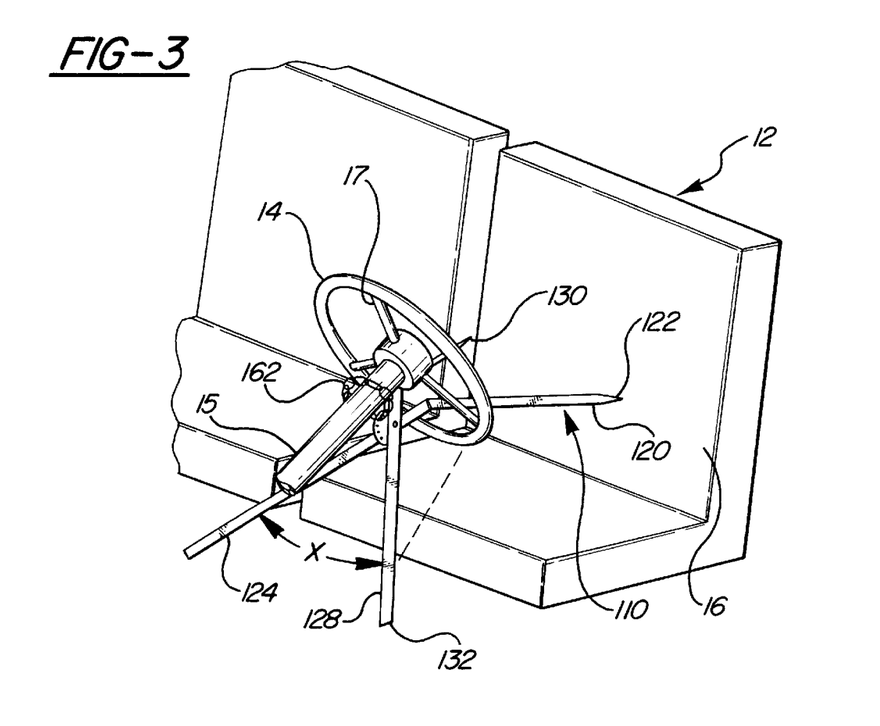
FIG. 3 is a perspective view of a second embodiment of the present invention use.
Figure 4:
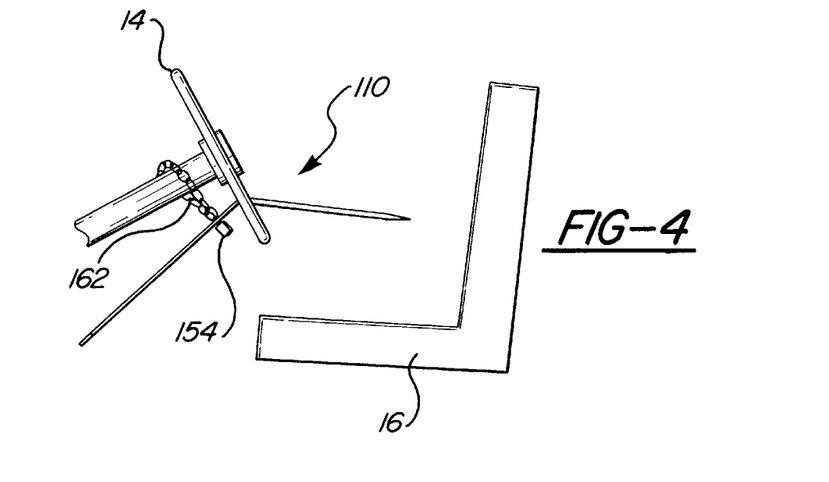
FIG. 4 is a side view of the second embodiment of the present invention.
Figure 5:
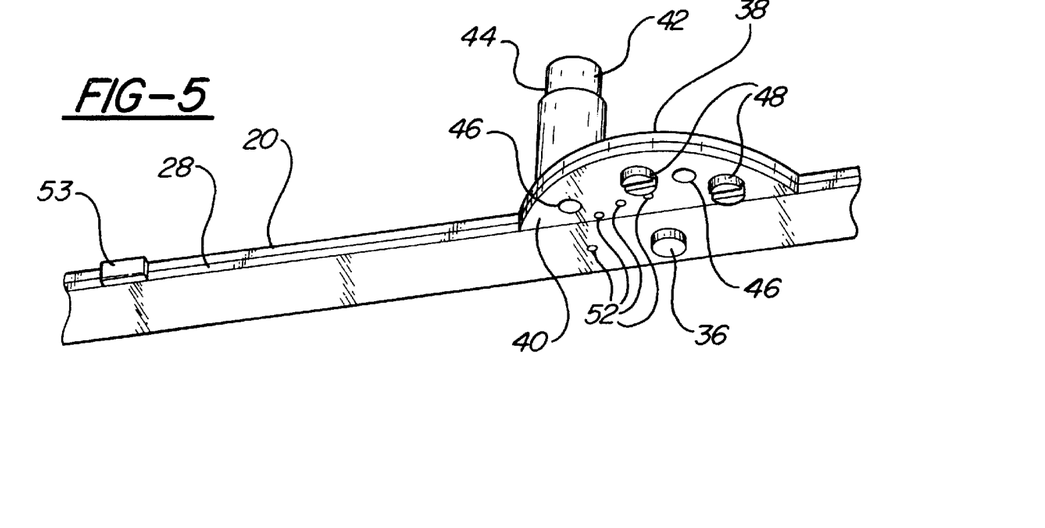
FIG. 5 is a detailed bottom perspective view of the first embodiment.
Figure 6:
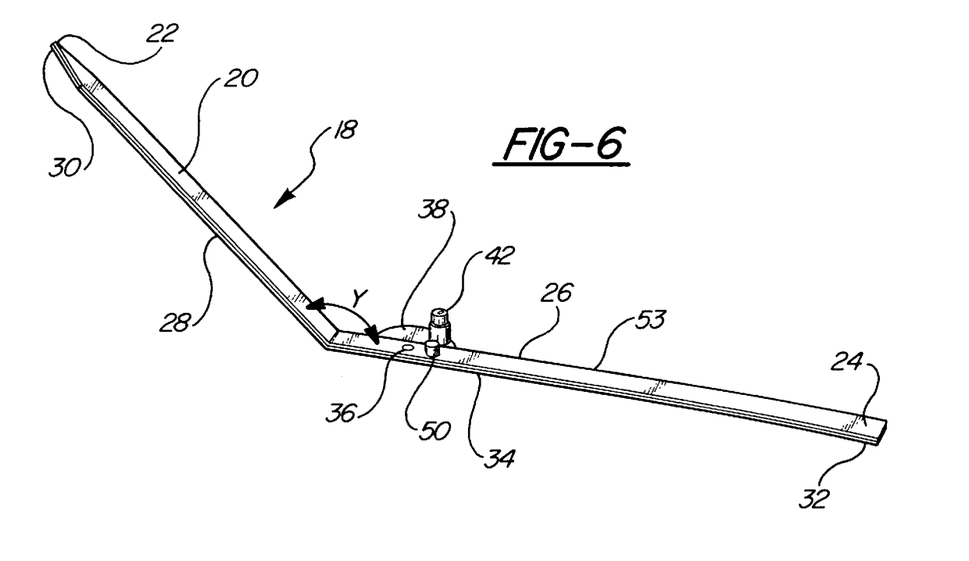
FIG. 6 is a top perspective view of the first embodiment.
Figure 7:
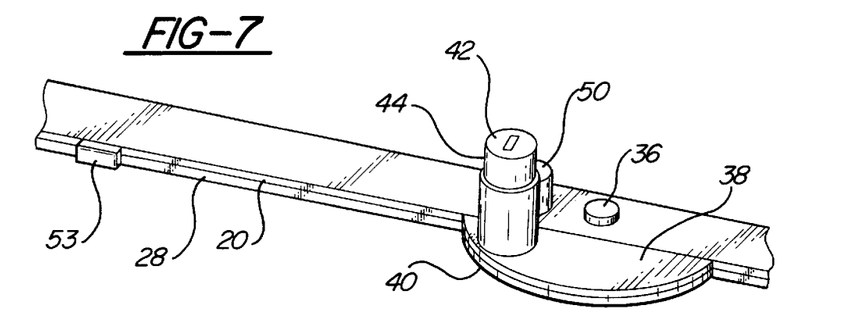
FIG. 7 is a detailed top perspective view of the first embodiment.

The effectiveness of the theft prevention device 110 is further enhanced when the theft prevention device 110 is properly placed within a steering wheel 14 and the chain 162 mounted padlock 154 is secured to the first and second arms 120, 128. The chain 162 prevents movement of the obstruction member 118 beyond the limits of the chain slack. In addition to placing the chain 162 about the steering column 15 of the vehicle, the chain 162 may be secured to the spokes 17 of the steering wheel 14.

A third embodiment of the present invention is disclosed in FIGS. 10–13. The third embodiment is substantially similar to the first and second embodiments, but includes a different locking structure. Specifically, the first and second arms 220, 228 are coupled by a pivot pin 236 secured between the first flange 238 of the first arm 220 and the second flange 240 of the second arm 228. The second flange 240 is slightly bigger than the first flange 238, and a small portion of the second flange 240 extends beyond the first flange 238.

As with the first embodiment, the first flange 238 of the first arm 220 is provided with a detent 250 and the second flange 240 of the second arm 228 is provided with a series of detent holes 252a, 252b spaced to engage the detent 250. At least two detent holes are provided in the second flange 240; a first detent hole 252a engaged when the obstruction member 218 is in its stored position and a second detent hole 252b engaged when the obstruction member 218 is in its open position.

Similarly, the first flange 238 is provided with a single hole 256 and the second flange 240 is provided with a series of holes 246a, 246b such that a padlock 254 may be passed through the hole 256 in the first flange 238 and a hole 246a, 246b in the second flange 240 to lock the obstruction member 218 in a desired orientation. At least two holes are formed in the second flange; a first hole 246a designed for locking the obstruction member 218 in its stored position and a second hole 246b designed for locking the obstruction member 218 in its open position.

The chain 262 and padlock 254 are securely attached to the obstruction member 218 by the provision of an eyebolt 264 secured to the underside of the second flange 240. The eyebolt 264 is releasably coupled thereto with the aid of an eyebolt housing 266 secured to the underside of the second flange 240 and a lock nut 268 threaded onto the shaft of the eyebolt 264.

Figure 12:
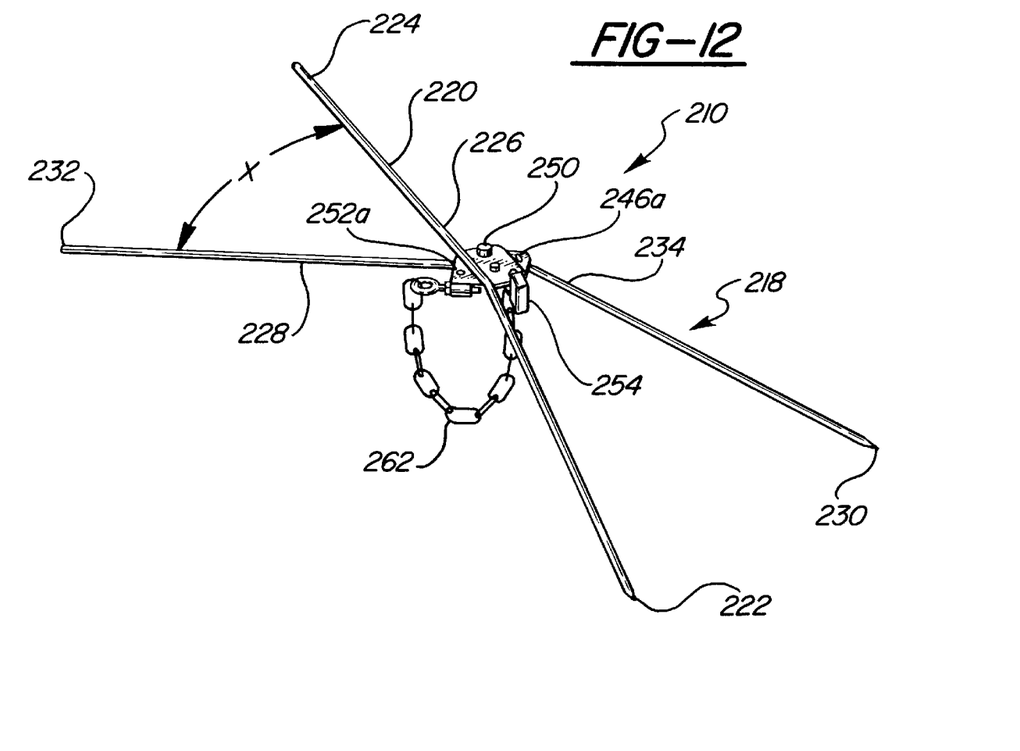
FIG. 12 is a perspective view of the third embodiment in its open configuration.
Figure 13:
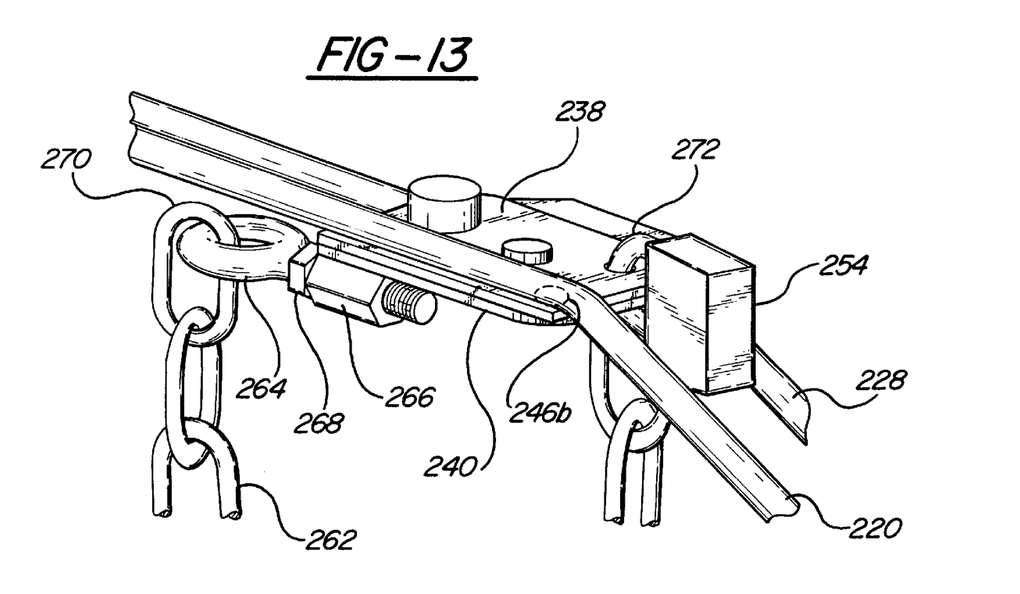
FIG. 13 is a detailed side perspective view of the third embodiment.

With reference to FIG. 13, the eyebolt 264 is shown with the lock nut 268 turned to secure the eyebolt 264 within the eyebolt housing 266. When the device is in its armed position (see FIG. 12), the eyebolt 264 cannot be removed from the eyebolt housing 266, since the chain 262 will eventually bind if one attempts to turn the eyebolt 264 and remove the first end 270 20 of the chain 262. However, when the padlock 254 is not locked to the first and second flanges 238, 240, the eyebolt 264 may be turned and removed when desired. In this way, the first end 270 of the chain 262 may be releasably secured to the obstruction member 218, while the padlock 254 at the second end 272 of the chain 262 engages the holes formed in the first and second flanges 238, 240.

As a result of the release feature, a user is provided with the option of using the device without the lock, using the device with a short chain connected such that the chain will reach around one of the spokes of the steering wheel to prevent removal of the device by cutting the steering wheel rim, and providing a longer chain that will wrap around the steering wheel column.

Figure 11:
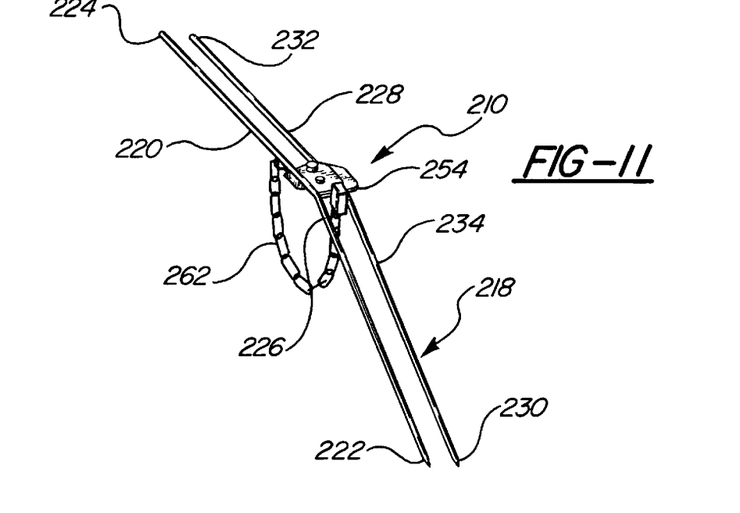
FIG. 11 is a perspective view of the third embodiment in its closed configuration.

When the obstruction member is properly positioned within a steering wheel 14, the chain 262 may be wrapped about a steering wheel spoke 17 or around the steering wheel column 15. When the obstruction 218 member is stored, the chain 262 may be wrapped around the obstruction member 218 or simply left to hang therefrom. Attachment of the chain 262 in this manner provides added security as a result of the attachment to the steering wheel 14 and provides a reliable method for storing the chain 262 and padlock 254 when the theft prevention device 210 is not in use.

A fourth embodiment of the present theft prevention device is disclosed in FIGS. 14, 15, 16 and 17. As with the prior embodiments, the fourth embodiment includes a first arm 320 and a second arm 328 pivotally secured at a central section. The central section 326 of the first arm 320 and the central section 334 of the second arm 328 are pivotally secured by a pivot pin 336 which permits the first and second arms 320, 328 to rotate relative to each other. In contrast to the prior embodiments, the first and second arms 320, 328 are bent adjacent each of their ends. The different bending arrangement facilitates implementation of the fourth embodiment and does not substantially alter the function of the embodiment.

Figure 14:
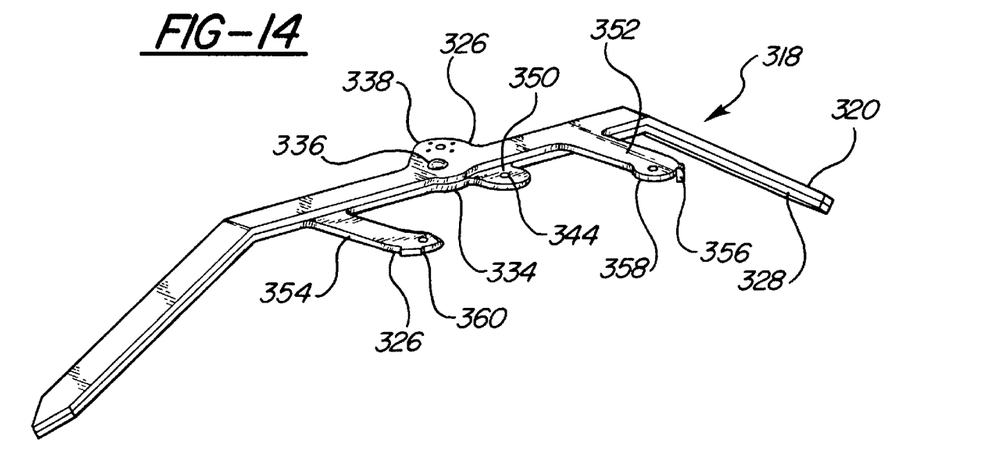
FIG. 14 is a perspective view of a fourth embodiment of the present invention.
Figure 16:
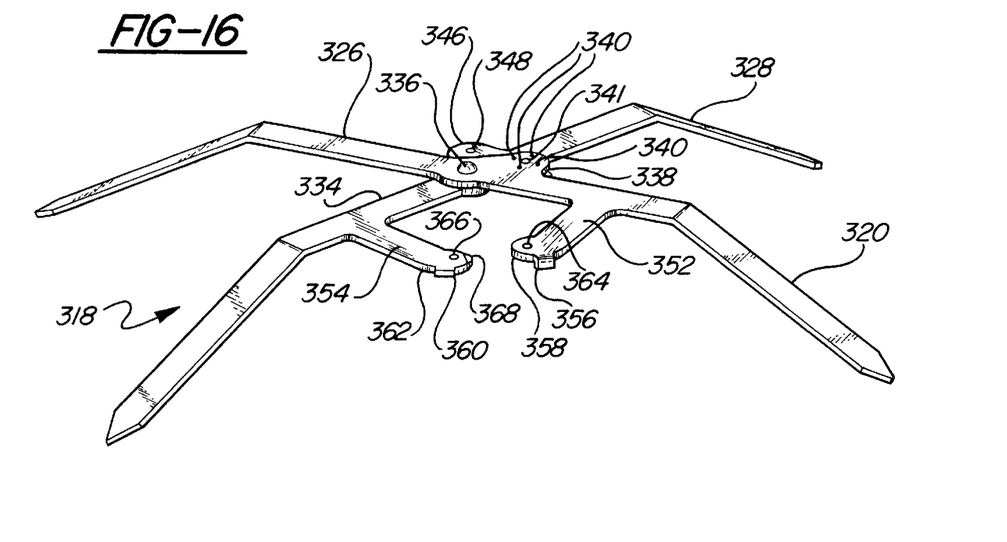
FIG. 16 is a perspective view of the fourth embodiment of the present invention with the arms in their closed storage position.

The first arm 320 is provided with an outwardly extending circular flange 338 adjacent the central section 326 of the first arm 320. As shown in FIGS. 14 and 16, the outwardly extending circular flange 338 includes four holes 340 surrounding a central hole 341. These holes permit the attachment of the lock 342 to the first arm 320 by screws (not shown), or other attachment means. As will be better appreciated from the following disclosure, the screws securing the lock 342 to the first arm 320 may not be removed when the present theft prevention device is in its armed open position, since the second arm 328 covers the screw heads in the armed open position. In addition, the holes 340 in the first arm 320 and the second arm 328 are such that the obstruction member 318 may be used without the disclosed lock 342, which may be replaced with any conventional lock positioned within the holes of the first and second arms 320, 328.

The outwardly extending circular flange 338 of the first arm 320 aligns with an open position circular flange 344 of the second arm 328 and a storage position circular flange 346 of the second arm 328. Specifically, the outwardly extending circular flange 338 of the first arm 320 aligns with the storage position circular flange 346 of the second arm 328 when the first and second arms 320, 328 are closed as shown in FIG. 16. When the first and second arms 320, 328 are closed as shown in FIG. 16, the hole 348 in the storage position circular flange 346 aligns with the lock 342 such that the locking member (not shown) may be selectively moved within the hole 348 of the storage position circular flange 346 to secure the obstruction member 318 in its storage position.

Figure 15:
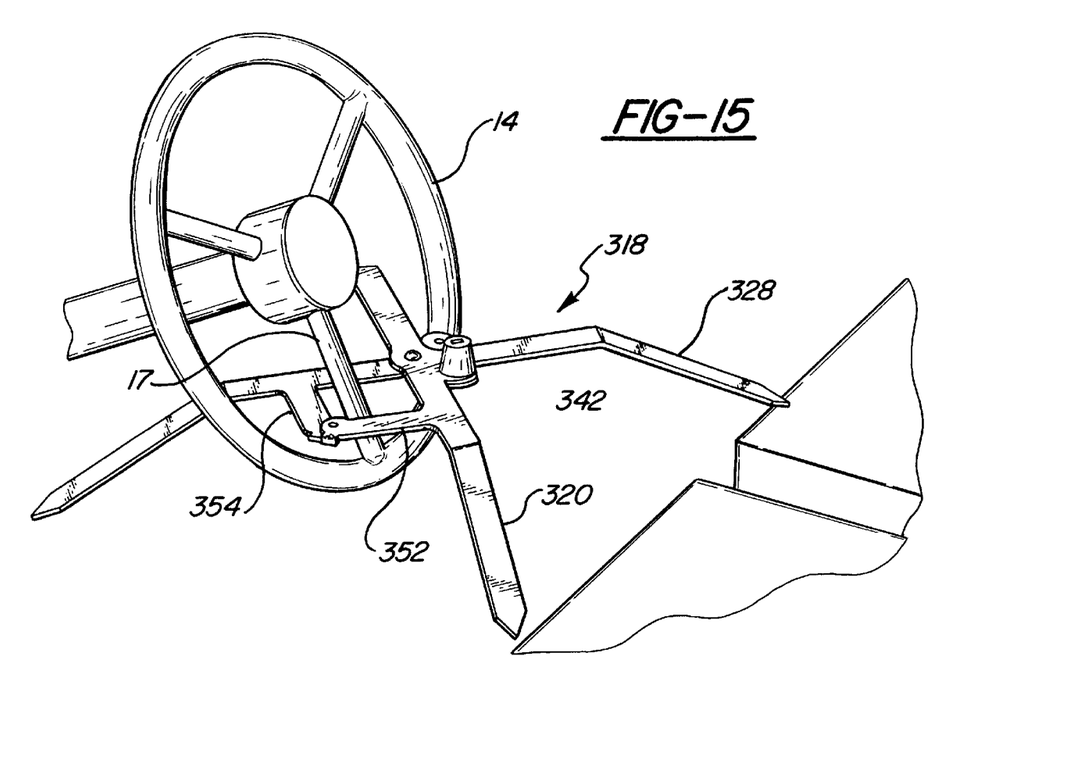
FIG. 15 is a detailed perspective view of the fourth embodiment of the present invention.
Figure 17:
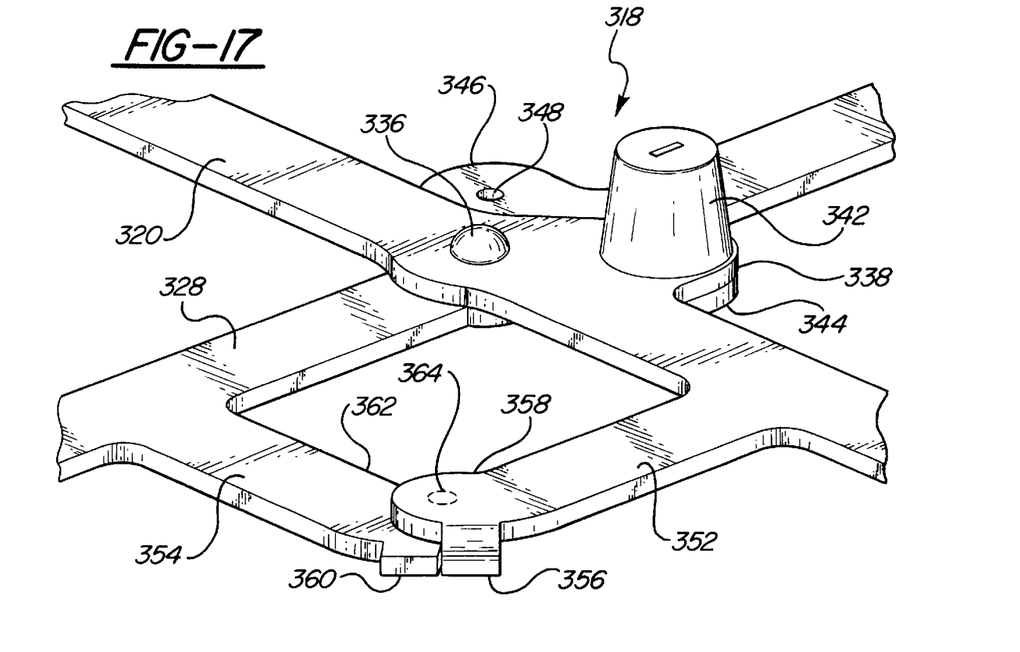
FIG. 17 is a perspective view of the fourth embodiment of the present invention in use.

Similarly, the outwardly extending circular flange 338 of the first arm 320 aligns with the open position circular flange 344 of the second arm 328 when the first and second arms 320, 328 are armed as shown in FIG. 14, 15 and 17. When the first and second arms 320, 328 are open as shown in FIG. 14, 15 and 17, the hole 350 in the open position circular flange 344 aligns with the lock 342 such that the locking member may be moved within the hole 350 of the open position circular flange 344 to secure the obstruction member 318 in its armed open position.

The first and second arms 320, 328 are further provided with a first arm extension 352 and a second arm extension 354, respectively. The first and second arm extensions 352, 354 are shaped and dimensioned to interlock when the first and second arms 320, 328 reach their armed open position, and the lock 342 is aligned with the hole 350 in the open position circular flange 344. Specifically, the first arm extension 352 is provided with a stop member 356 at its distal end 358 and the second arm extension 354 is provided with a stop member 360 at its distal end 362. The stop member 356 of the first arm extension 352 and the stop member 360 of the second arm extension 354 engage one another when the first and second arms 320, 328 reach their armed open position.

In addition to employing the stop members 356, 360 of the first and second arm extensions 352, 354 to ensure alignment of the first and second arms 320, 328 in their armed open position, the first arm extension 352 includes a recess 364 on its underside that aligns with a rivet head extension 366 on the upper side of the second arm extension 354. As the first arm extension 352 and the second arm extension 354 are drawn together, the first arm extension 352 must ride up a beveled ramp 368 formed on the distal end 362 of the second arm extension 352. As the first arm extension 352 rides up the ramp 368, the first and second arm extensions 352, 354 frictionally engage each other. When the rivet head extension 366 moves within the recess 364, the first and second arms 320, 328 are held in an open position in essentially the same manner as a detent type mechanism.

With the first and second arms 320, 328 held in an open position, the user is free to actuate the lock 342 and move the locking member within the hole 350 formed in the open position circular flange 344. In this way, the first and second arms 320, 328 are securely locked in their armed open position.

With reference to FIG. 17, the obstruction member 318 is secured within the steering wheel 14 such that the first and second arm extensions 352, 354 wrap around one of the steering wheel spokes 17. Positioning the first and second arm extensions 352, 354 about a spoke 17 of the steering wheel 14 accomplishes a function similar to the chain discussed with regard to the prior embodiments. Specifically, by wrapping the first and second arm extensions 352, 354 around the spoke 17 of the steering wheel 14, movement of the obstruction member 318 is restricted and undesired removal of the obstruction member 318 is further minimized.

When using either the first embodiment, the second embodiment, the third embodiment or the fourth embodiment, the obstruction member is moved within the steering wheel, between adjacent spokes of the steering wheel, with the first arm and the second arm in their closed orientation. Once the first and second arms are properly positioned within the steering wheel, the first arm and the second arm are pivoted to create an X-shaped orientation (see FIGS. 1, 3 and 13). Generally, the approximate 66° position (preferably 90° for the fourth embodiment) is sufficient to prevent the obstruction member from being removed from within the steering wheel. However, the first and second arms may be placed at any orientation which optimizes the placement of the obstruction member within specific vehicles. Once the first and second arms are properly positioned, the lock is applied between the first arm and the second arm.

The obstruction member is placed within the steering wheel such that it may not be removed therefrom without unlocking the first and second arms relative to each other. While it is secured within the steering wheel, the obstruction member can be moved in various directions, but it may not be removed. Specifically, if an attempt is made to move the first ends of the first and second arms in a counterclockwise direction, up and away from the back portion of the front seat, the second ends of the first and second arms will abut the front edge of the seat and maintain the first ends within the seating area (see FIG. 2). In addition, if an attempt is made to push the first ends of the first and second arms in a clockwise direction to allow room for one's legs within the passenger compartment such that a user may move his or her legs under the steering wheel in a normal driving position, the first ends of the first and second arms are forced downward and the seat area is blocked where one would normally sit while driving the vehicle (see FIG. 4). In summary, obstruction of the passenger compartment is always maintained, preventing a would be thief from accessing the passenger compartment in the proximity of the steering wheel to steal the vehicle.

Attempts to remove the obstruction device from within the steering wheel are prevented by the extended first ends of the first and second arms and the extended second ends of the first and second arms. Any attempt to withdraw the obstruction member is met by abutment with the spokes or rim of the steering wheel.

If the arms, for example, are bent or crimped, the obstruction member may move somewhat, but the obstruction member will still obstruct the front seat area. In addition, bending is made difficult by the fact that the arms and other parts of the theft prevention device are not rigidly attached to anything so as to facilitate bending, or cutting for that matter.

The present theft prevention device works under the theory that two objects cannot occupy the same space at the same time. No matter how the theft prevention device is manipulated, the device will obstruct some part of the driver's seating area. As such, not only is it impossible to drive the vehicle, but the dashboard devices are also protected.

When the second embodiment is employed, the chain is of a length sufficient to permit the padlock to engage the obstruction member while properly positioning the obstruction member within the steering wheel, or the steering wheel spokes if the chain is wrapped around them. The chain may be provided with a soft cover to prevent the chain from rattling or scratching the steering wheel spokes or the steering column.

The present theft prevention device is preferably made from stainless steel, or a similar metal, to make the device difficult to cut or bend. However, the device could be made from a variety of strong materials without departing from the spirit of the present invention. In addition, the device may be brightly colored so that a would-be thief may readily see the device within a vehicle.

While the preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A theft prevention device for a vehicle including a passenger compartment in which a steering wheel is provided to control the movement of the vehicle, comprising:

a first arm having a first end, a second end and a central section;

a second arm having a first end, a second end and a central section, wherein the central section of the first arm is pivotally secured to the central section of the second arm;

a first arm extension coupled to the first arm and a second arm extension coupled to the second arm, the first arm extension and second arm extension being shaped to engage to form a ring which may be wrapped about a spoke of a steering wheel to secure the theft prevention device to a steering wheel when the first arm and the second arm are properly aligned; and a lock selectively coupled between the first arm and the second arm to lock the first arm relative to the second arm and securely position the theft prevention device within a vehicle steering wheel by locking the first arm and the second arm in an X-shaped orientation to obstruct the passenger compartment in the vehicle and deter the theft of the vehicle.

2. The theft prevention device according to claim 1, wherein the lock is a spring lock secured to the first arm.

3. The theft prevention device according to claim 1, wherein the first end of the first arm is pointed and the first end of the second arm is pointed to further obstruct the seating area of the vehicle.

4. The theft prevention device according to claim 1, wherein the central section of the first arm includes a first flange and the central section of the second arm includes a second flange, and the lock is coupled to the first flange and the second flange to lock the first arm and the second arm in a desired orientation.

5. The theft prevention device according to claim 4, wherein the second arm includes a third flange which may be aligned with the first flange of the first arm, and the lock is coupled to the first flange and third flange to lock the first arm and the second arm in a desired orientation.

6. The theft prevention device according to claim 4, wherein the lock is a spring lock secured to the first flange.

7. The theft prevention device according to claim 1, wherein the first arm extension includes a stop member which engages a stop member of the second arm extension when the first arm and the second arm are properly aligned.

8. The theft prevention device according to claim 1, wherein the first arm extension and the second arm extension include means for holding the first arm and the second arm in proper alignment.

* * * * *